United States Patent [19]

Difiore

[11] Patent Number: 5,699,049
[45] Date of Patent: Dec. 16, 1997

[54] MONITORING SYSTEM FOR NON-PRESSURIZED CONDUIT

[76] Inventor: Dante Difiore, 5387 Wilson Mills Rd., Highland Heights, Ohio 44143

[21] Appl. No.: 495,848

[22] Filed: Jun. 28, 1995

[51] Int. Cl.⁶ .................................................. G08B 21/00
[52] U.S. Cl. .................... 340/618; 340/608; 340/623; 340/624; 340/539; 137/558; 73/290 R; 73/305; 73/307
[58] Field of Search ..................... 340/539, 618, 340/603, 604, 606, 608, 623, 624, 625, 825.69, 825.72, 616; 73/290 R, 305, 307; 137/558; 200/61.04, 84 R

[56] References Cited

U.S. PATENT DOCUMENTS

| | | | |
|---|---|---|---|
| 354,688 | 12/1886 | Clark | 340/620 |
| 1,164,882 | 12/1915 | Sommer | 340/616 |
| 2,630,875 | 3/1953 | Sachs | 182/15 |
| 2,761,037 | 8/1956 | Thomas et al. | 200/83 |
| 2,985,187 | 5/1961 | Hamilton | 137/242 |
| 3,069,671 | 12/1962 | Taylor | 340/244 |
| 3,185,789 | 5/1965 | Gunther | 200/84 |
| 3,202,165 | 8/1965 | Yavicoli | 137/107 |
| 3,311,722 | 3/1967 | Hammerschmidt et al. | 200/61.05 |
| 3,399,399 | 8/1968 | Apfelbaum | 340/244 |
| 3,757,316 | 9/1973 | Florenzo | 340/243 |
| 3,774,187 | 11/1973 | Windham | 340/243 |
| 3,874,403 | 1/1975 | Fischer | 137/386 |
| 4,091,365 | 5/1978 | Allen | 340/243 |
| 4,216,468 | 8/1980 | Kaufmann | 340/620 |
| 4,230,578 | 10/1980 | Culp et al. | 210/86 |
| 4,392,128 | 7/1983 | Young et al. | 340/616 |
| 4,398,186 | 8/1983 | Statz | 340/616 |
| 4,418,712 | 12/1983 | Braley | 137/312 |
| 4,546,346 | 10/1985 | Wave et al. | 340/608 |
| 4,569,312 | 2/1986 | Riddell et al. | 122/504 |
| 4,778,957 | 10/1988 | Crowell | 200/84 |
| 4,796,658 | 1/1985 | Caple | 137/312 |
| 4,922,226 | 5/1990 | Hsieh et al. | 340/521 |
| 4,922,234 | 5/1990 | Murphy | 340/608 |
| 4,937,559 | 6/1990 | Meacham et al. | 340/618 |
| 4,961,068 | 10/1990 | Hendricksen | 340/616 |
| 4,962,370 | 10/1990 | Borriello | 340/623 |
| 5,028,910 | 7/1991 | Meacham et al. | 340/616 |

*Primary Examiner*—Jeffery Hofsass
*Assistant Examiner*—Julie B. Lieu
*Attorney, Agent, or Firm*—David A. Burge, Esq.

[57] ABSTRACT

Abnormal flow of liquid in a non-pressurized conduit such as a drain line of a building is detected by a liquid level sensor unit connected at a conduit location not anticipated to fill with liquid during normal flow, so that liquid backing up at such location will enter a sensor chamber of the unit to cause a liquid level sensor to signal an indicator. A monitoring system uses at least one such sensor to signal at least one local or remote indicator that indicates which sensor has detected abnormal flow. The system can monitor for short times particular drain lines suspected of experiencing abnormal flow, or can serve on a long-term basis to provide an early warning of clogging and blockage in lines selected for monitoring. Each sensor unit preferably uses a small liquid level sensor connected centrally to a mounting member that defines an annular, circumferentially extending mounting flange that can be releasably clamped in place adjacent an end region of a length of conventional pipe that is used to define the sensor chamber of the unit, to thereby provide a simple and inexpensive, easily installed and easily serviced sensor unit that can optionally house a battery and light to provide a local indication of sensed abnormal flow.

38 Claims, 5 Drawing Sheets

MONITORING SYSTEM FOR NON-PRESSURIZED CONDUIT

BACKGROUND OF THE INVENTION

1. Field of the Invention

The present invention relates to the provision and use of a monitoring system employing sensor units and indicators for detecting and signalling the presence of abnormal flow characterized by the backup of liquid in non-pressurized conduits such as drain conduits of a residential or commercial building. More particularly, the invention relates to the provision of a monitoring system that utilizes one or more sensor units wherein each of the sensor units preferably employs a small liquid level sensor connected centrally to a mounting member that defines an annular, circumferentially extending mounting flange that can be releasably clamped in place adjacent an end region of a length of conventional pipe that preferably also defines a sensor chamber of the unit, whereby sensor units are provided that are of simple and inexpensive design, that are easily installed and easily serviced, and that can be compatibly utilized with a variety of commercially available signal responsive devices to provide a monitoring system that includes local and/or remotely located indicators that respond to operation of the sensor units to indicate where among the one or more monitored conduits that abnormal flow is sensed.

2. Prior Art

In maintaining a residential or a commercial building, instances are encountered when it needs to be determined whether non-pressurized liquid conduits such as storm and sanitary drain lines are providing proper normal flow. If one or more of these non-pressurized conduits are beginning to clog, have become blocked or are under-sized, such conditions cause abnormal flow that tends to manifest itself in the filling and backing up of liquid within the conduits at locations that should not fill during conditions of normal flow. To determine where and under what circumstances that abnormal flow (characterized by abnormal conduit filling within portions of a non-pressurized conduit that do not fill with liquid during conditions of normal flow) is found to occur, it is desirable to provide a system for monitoring the operation of non-pressurized liquid conduits at selected locations where it is anticipated that, under conditions of normal flow, the conduits should not fill with liquid.

In maintaining buildings that incorporate a large number of drain lines servicing a variety of needs, it is desirable to provide a permanently installed monitoring system that will indicate when and where one or more of the drain lines are beginning to clog, have become blocked or are no longer of sufficient size to serve their current function. It also is desirable to be able to temporarily connect a monitoring system to one or more drain lines at selected locations near to but upstream from locations where abnormal flow problems are suspected to be occurring so that locations of abnormal flow can be pin-pointed, and so that circumstances under which abnormal flow occurs can be determined.

Liquid level sensors and liquid level responsive switches of a variety of types have been proposed and are commercially available. Many include floats that are movably supported for being buoyed upwardly in the presence of liquid, with some carrying permanent magnets that operate reed switches for providing signals indicative of the sensed presence of liquid. Some commercially available float-type liquid level responsive switches utilize floats that normally are held in a downward position by the force of gravity, but are buoyed to move upwardly along a vertically extending guide in the presence of liquid. Others utilize float arms that extend generally horizontally, and that pivot slightly upwardly when buoyed by the presence of liquid.

While conduit back-flow sensors of a variety of types have been proposed for monitoring drain lines, most are characterized by one or more drawbacks. Many are relatively complex and expensive, requiring special housings or other forms of sensor mounts that are not well suited for connection to a wide variety of metal, plastic and tile-type drain conduits. Many are specially configured to be installed at a so-called "cleanout" or adjacent a trap, and are not suitably configured to permit versatile installation elsewhere. Few are easy to install and easy to remove, which is a significant shortcoming inasmuch as backflow in drain lines often brings with it a certain amount of debris that may tend to collect about the locations of sensors, which can interfere with sensor operation, and which may necessitate the conduct of periodic sensor cleaning, maintenance and/or replacement, depending on the character of the conduit being monitored and the circumstances of its use.

Characteristically lacking in prior proposals is the provision of an extremely simple and inexpensive sensor mount that will permit a liquid level sensor to be removably clamped in place at an end of a length of conventional pipe, that will enable the sensor units to be utilized with versatility at selected locations along metal, plastic and vitreous tile conduits, and that will work well in combination with a wide variety of existing types of signal responsive devices to provide local and/or remotely located indicators of sensed abnormal flow.

SUMMARY OF THE INVENTION

The present invention addresses the foregoing and other needs and drawbacks of the prior art by providing a monitoring system for non-pressurized liquid conduits, including sensor units that can be installed with great versatility at selected locations to detect abnormal flow in non-pressurized conduits formed from such materials as metal and plastic, and in vitreous tile type drain lines, with each of the sensors being advantageously connected to a separate mounting member that has a circumferentially extending mounting flange that can be removably clamped in place adjacent an end of a length of pipe (to thereby provide an easy to install sensor unit that also can be easily removed to facilitate cleaning, maintenance and replacement, if needed), and that can be readily utilized together with commercially available signal responsive devices to form a monitoring system that will provide local and/or remotely located indicators of sensed abnormal flow.

In accordance with the preferred practice of the present invention, a monitoring system is provided that employs one or more sensor units, with each of the sensor units being installed at a separate selected conduit location to communicate with conduit portions that should not fill with liquid during conditions of normal flow—so that abnormal flow can be detected by sensing the filling and the back-up of liquid at these selected conduit locations. In preferred practice, the sensor units each characteristically utilizes a liquid level sensor of relatively small size that can operate within a short length of conventional pipe of typically about 1¼ to about 1½ inch nominal diameter, with each of the sensor units preferably having its liquid level sensor centrally connected to a relatively simply configured mounting member that defines an annular, circumferentially extending mounting flange that is sized and configured to be releasably clamped in place adjacent an end region of a length of conventional pipe that preferably also serves to define a sensor chamber of the unit, to thereby provide a simple and inexpensive, easily installed and easily serviced sensor unit.

A feature of the sensor mounting system of the present invention resides in its versatility. In one respect this versatility manifests itself in the provision of a sensor mount that can easily accommodate the use of a variety of types of commercially available liquid level sensors. If a liquid level sensor of a "vertically oriented" type is to be used (e.g., a sensor that has a float that needs to move freely along a vertically oriented guide), the mounting system can make use of a short length of vertically extending pipe that is connected to the conduit to be monitored for defining a generally vertically extending sensor chamber into which the sensor extends, and within which the sensor operates. If a liquid level sensor of a "horizontally oriented" type is to be used (e.g., a sensor that has an elongate float arm that needs to extend substantially horizontally), the mounting system can make use of a short length of horizontally extending pipe that is connected to the conduit to be monitored for defining a generally horizontally extending sensor chamber into which the sensor extends, and within which the sensor operates.

The versatility of the sensor mounting system of the present invention also manifests itself in fact that it can be used, for example, with pipes formed from a wide variety of materials such as metal or plastic, and with vitreous drain tile. When used with vitreous drain tile, a sensor carried on a mounting member typically is installed by releasably clamping a circumferentially extending flange of the mounting member adjacent an end region of a length of metal or plastic pipe, and by extending the length of pipe into the vitreous tile to position the pipe-carried sensor at an appropriate location where the tile does not fill with liquid during normal flow.

The sensor units of the monitoring system can be "hard wired" so as to be electrically connected to local and remote indicators, can be used with "wireless" signal transmitters (e.g., radio signal and infrared signal transmitters) that do not need to be "hard-wired" to indicators in order to operate remotely located signal responsive indicators, and can be used with encoded signal transmitters that send pulse type indicators that decode encoded signal transmissions to display indications identifying which ones of the sensor units are detecting abnormal flow.

Also, recording devices may be connected to the sensor units to receive signals therefrom, and to record precisely when and in what sequence individual ones of the sensor units encounter a backup of liquid, and precisely when and in what sequence the backup of liquid in the sensor units is found to subside. By this arrangement, precise information can be recorded that will permit appropriate ones of the monitored conduits to be serviced, cleaned and/or replaced as may be needed to prevent recurring abnormal flow.

BRIEF DESCRIPTION OF THE DRAWINGS

These and other features, and a fuller understanding of the present invention may be had by referring to the following description and claims, taken in conjunction with the accompanying drawings, wherein:

DESCRIPTION OF THE PREFERRED EMBODIMENT

Figure 1:
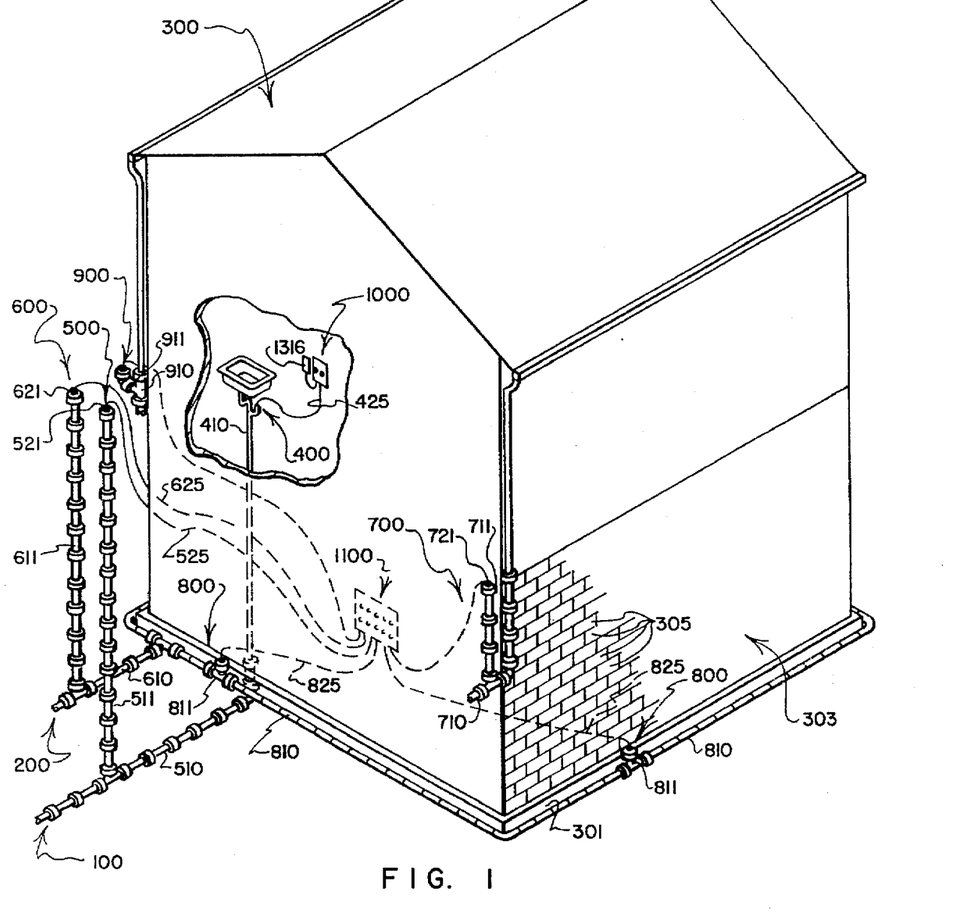
FIG. 1 is a perspective view of portions of the storm and sanitary drain lines that serve a residential building, showing sensors that embody the preferred practice of the present invention connected thereto at selected locations, with lighted display panels being provided within the building to provide indications when the various sensors detect abnormal flow.

Referring to FIG. 1, portions of a sanitary drain system 100 and portions of a storm drain system 200 that serve a typical residential building 300 are depicted, with sensor units 400, 500, 600, 700, 800 and 900 that embody features of the preferred practice of the present invention shown connected to various portions of the sanitary and storm drain systems 200, 300. Also depicted in FIG. 1 is a display panel 1000 that is connected by a wire 425 to the sensor unit 400, and a display panel 1100 that is connected by wires 525, 625, 725, 825 and 925 to the sensor units 500, 600, 700, 800 and 900, respectively.

Referring to FIGS. 1–4, the sensor unit 400 is connected to a sink drain line 410 of the sanitary drain system 100.

Figure 5:
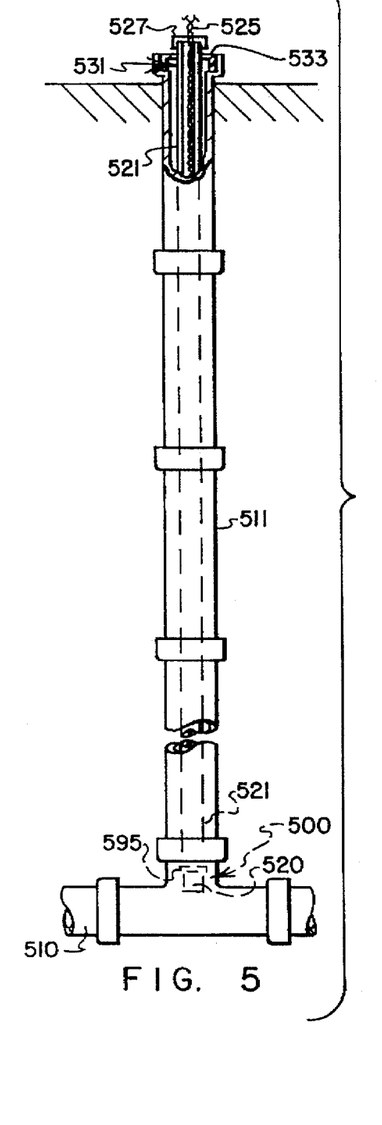
FIG. 5 is a foreshortened side elevational view, on an enlarged scale, showing portions of a cleanout branch of the sanitary sewer line of FIG. 1, and depicting portions of a sensor unit installed therein.
Figure 6:
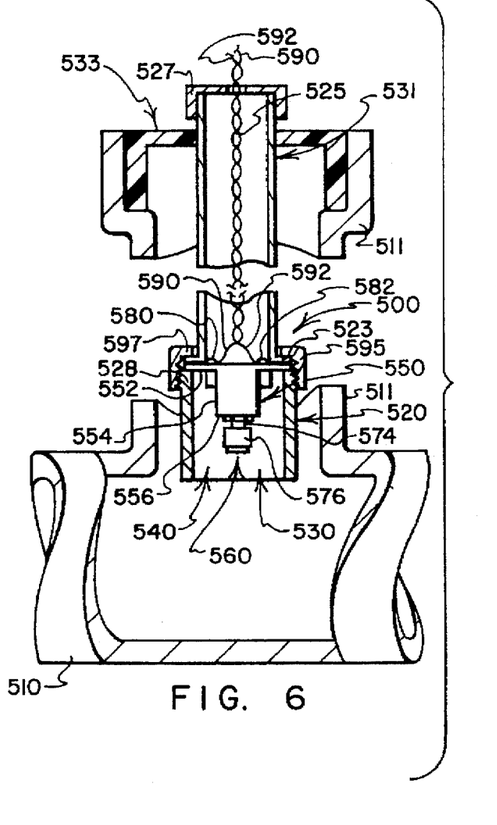
FIG. 6 is a foreshortened side elevational view, on a further enlarged scale, with portions broken away and depicted in cross section, showing in greater detail limited portions of what is depicted in FIG. 5.

Referring to FIGS. 1, 5 and 6, the sensor unit 500 is mounted in a cleanout branch line 511 at a juncture of the cleanout branch line 511 with a main drain line 510 of the sanitary drain system 100. The locations along the drain lines 410, 510 of the sanitary drain system 100 where the sensor units 400, 500 are stationed are selected as being locations where the conduits 410, 510 should not fill with liquid under conditions of normal flow.

Referring to FIG. 1, the sensor unit 600 is mounted in a cleanout branch line 611 at a juncture of the cleanout branch line 611 with a main drain line 610 of the storm drain system 200 (in exactly the same manner that the sensor unit 500 is mounted in the cleanout branch line 511, as depicted in FIGS. 1, 5 and 6). Referring to FIG. 1, the sensor unit 700 is connected to a test port branch line 711 at a juncture of the test port branch line 711 with a downspout drain line 710 of the storm drain system 200 (in substantially the same manner that the sensor units 500, 600 are mounted in the cleanout branch lines 511, 611). Referring to FIG. 1, the sensor units 800 are identically connected to "T" branches 811 of a footer tile drain line 810 of the storm drain system 200 at locations where the "T" branches 811 join with the footer tile drain line 810, with a typical one of the connections of a sensor unit 800 being further illustrated in FIG. 7. The locations along the drain lines 610, 710 and 810 of the storm drain system 200 where the sensor units 600, 700 and 800 are stationed are selected as being locations where the conduits 610, 710 and 810 should not fill with liquid under conditions of normal flow.

Figure 8:
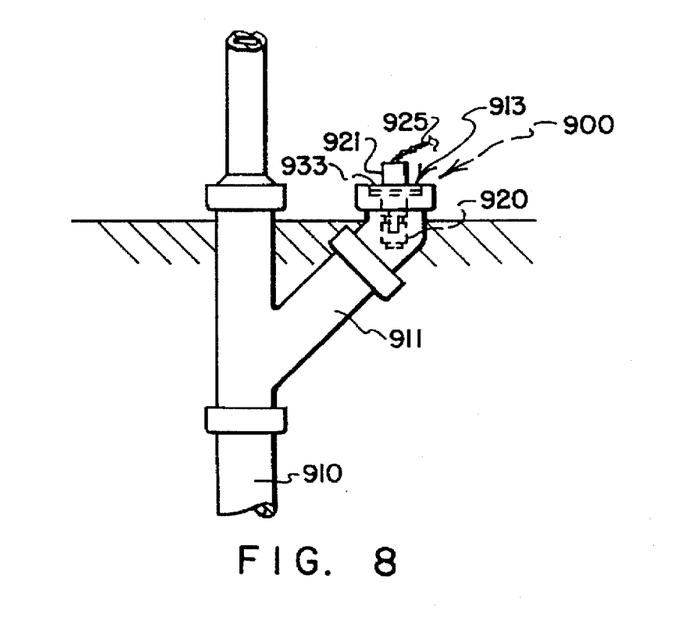
FIG. 8 is a side elevational view showing portions of a downspout drain line connected to the lower end of a downspout of the building of FIG. 1, with the view also showing in greater detail a typical downspout drain line sensor installation such as is utilized in the drain line plumbing system of FIG. 1.

Referring to FIGS. 1 and 8, the sensor unit 900 is connected to a "Y" branch 911 of a downspout drain line 910 of the storm drain system 200. The location of the sensor unit 900 is at a height (alongside the downspout drain line 910) at which the downspout drain line 910 ought not fill with liquid under conditions of normal flow—and hence represents a selected sensor location that can be used to determine whether abnormal flow (characterized by a filling of the downspout drain line 910 to the height of the sensor 900) occurs in the downspout drain line 910. Instead of employing the inclined "Y-line" conduit 911 that is depicted in FIGS. 1 and 8 as extending from the drain line 910 to the location of the sensor 900, a more direct, substantially horizontally extending "T-line" conduit (not shown) could be employed and would serve the same purpose. The "Y-line" conduit 911 is preferred in this instance simply because less of it is likely to be exposed above ground level.

Figure 2:
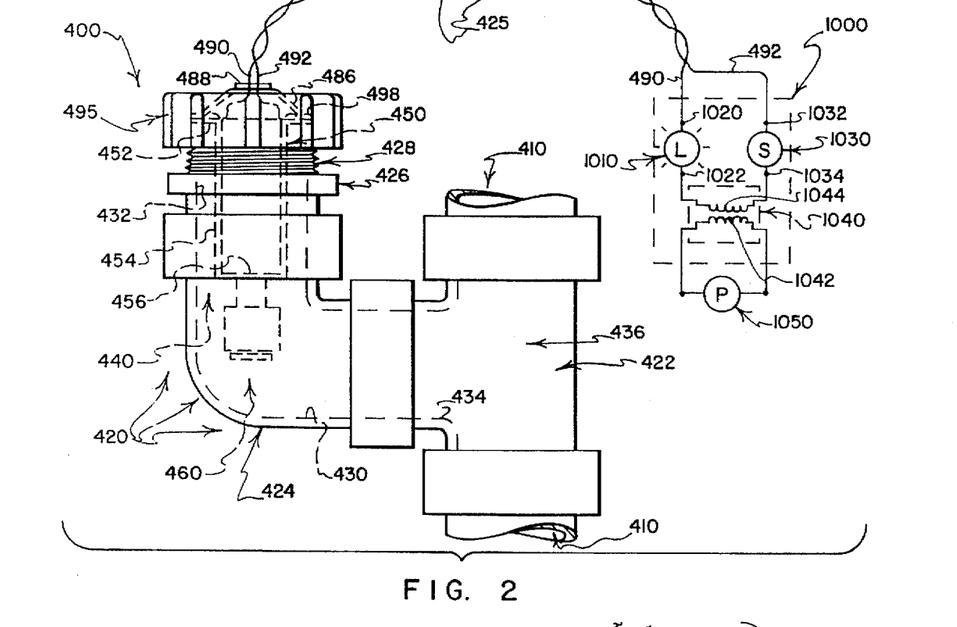
FIG. 2 is a foreshortened side elevational view, on an enlarged scale, showing a sink drain line sensor unit installation of the building of FIG. 1, and schematically depicting one of the lighted display panels.

Referring to FIG. 2, the sensor unit 400 is connected to the sink drain line 410 by what will be referred to as a "length of pipe" that is designated generally by the numeral 420. The length of pipe 420 includes a "T" fitting 422 installed in the sink drain line 410, a street ell fitting 424 connected to the "T" fitting 422, and coupler fitting 426 connected to the street ell fitting 424. Outer surface portions of the upper end region of the coupler fitting 426 are threaded, as is indicated generally by the numeral 428.

The fittings 422, 424 and 426 cooperate to define the "length of pipe" 420 as having an internal passage 430 which is of generally L-shaped configuration, having an upper end region 432 that opens upwardly, and having a lower end region 434 that communicates with the interior of the sink drain line conduit 410 at a selected location that is designated generally by the numeral 436 (see FIG. 2). The hollow interior of the upper end region 432 defines what will be referred to as a "sensing chamber" 440 of the sensor unit 400.

Figures 3, 4:
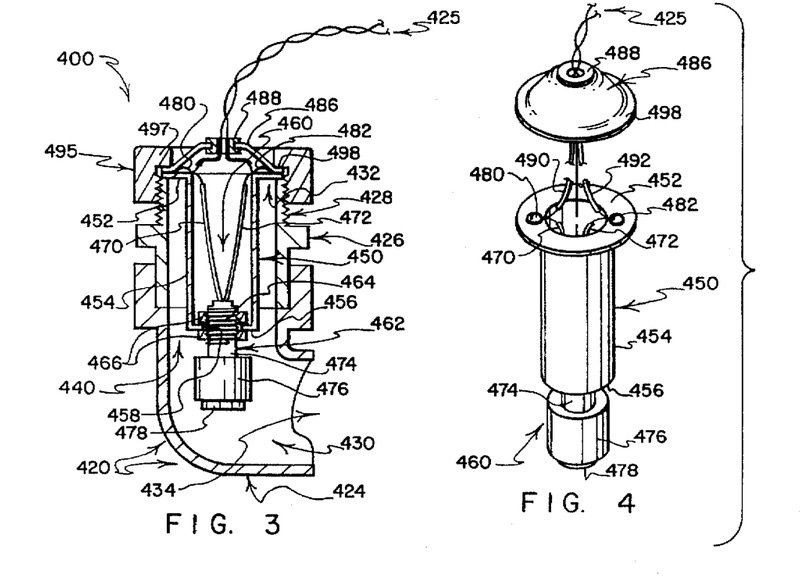
FIG. 3 is a side elevational view similar to FIG. 2 but with portions of outer components broken away and shown in cross section to permit details of inner components to be viewed.
FIG. 4 is a partially exploded perspective view showing selected components of the sink drain line sensor unit.

Referring to FIGS. 2-4, the sensor unit 400 also includes an inverted-hat shaped mounting member 450 having a generally annular-shaped mounting flange 452 that extends circumferentially about a central portion 454 that depends from the mounting flange 452 to a location where a central bottom wall 456 is defined. As is best seen in FIG. 3, an opening 458 is formed through the central bottom wall 456, through which an externally threaded portion 464 of a housing 462 of a float-type liquid level responsive switch 460 extends. Referring to FIG. 3, the switch 460 is securely connected to the central bottom wall 456 by a pair of nuts 466 that are threaded onto the treaded portion 464 and are tightened into clamping engagement with opposed upper and lower surfaces of the central bottom wall 456.

The switch 460 is a purchased item of a type that is commercially available from a variety of sources, an example being liquid level sensing switch number M3326 sold by Madison Company of Branford, Conn. 06405. The housing 462 of the switch 460 protectively encloses a reed switch (not shown) having a pair of relatively movable contacts (not shown) to which a pair of wires 470, 472 connect, which contacts are "normally open" but close in the presence of a magnetic field. A lower portion of the housing 462 defines a vertically extending guide stem 474 that extends centrally through a generally torroidal-shaped permanent magnet 476.

The magnet 476 normally resides toward the bottom of the guide stem 474 (in what is referred to as a "switch-non-operated" position) in abutting engagement with an enlarged stop formation 478, but slides easily upwardly along the stem 474 (to what is referred to as a "switch-operated" position located adjacent the central bottom wall 456 of the mounting member 450), and is formed of sufficiently light-density material to be buoyed upwardly (i.e., to "float") when in the presence of liquid such as water. When in its lowermost position (abutting the stop formation 478, as depicted in FIGS. 3 and 4), the float-magnet 476 does nothing to disturb the "normally open" character of the contacts of the switch 460; however, when buoyed upwardly along the stem 474, the float-magnet 476 causes the contacts of the switch 460 to close—thereby causing the wires 470, 472 of the switch 460 to be electrically connected.

Referring to FIG. 4, the wires 470, 472 of the switch 460 are connected to a pair of threaded terminals 480, 482 that are carried by the annular flange 452 of the mounting member 450. The wire 425 includes a twisted pair of conductors 490, 492 that connect to the terminals 480, 482, respectively, and to the display panel 1000 that is depicted in FIG. 2.

Referring to FIG. 2, the display panel 1000 includes a light 1010 having a pair of terminals 1020, 1022, with the conductor 490 of the wire 425 being connected to the terminal 1020. The display panel 1000 also has a switch 1030 that has a pair of terminals 1032, 1034, with the conductor 492 of the wire 425 being connected to the terminal 1032. The display panel 100 also is provided with a transformer 1040 for supplying low voltage (for example 20 volts A.C.) from a power source that is indicated by the numeral 1050—for which purpose the transformer 1040 has a primary winding 1042 connected to the power source 1050, and a secondary winding 1044 connected between the terminals 1022, 1034.

Unless it is desired for the display panel 1000 to not serve as an indicator that responds to the float-magnet 476 of the switch 460 being buoyed upwardly in the sensor chamber 440 by the presence of liquid therein, the display panel switch 1030 is set such that its contacts (not shown) are "normally closed." By this arrangement, all that is needed to cause the indicator light 1010 to be lighted by power supplied from the transformer 1040 is for the "normally open" contacts of the switch 460 to close in response to the float-magnet 476 of the switch 460 being buoyed upwardly in the sensor chamber 440 by the presence of liquid therein.

Referring to FIGS. 2–4, the sensor unit 400 is depicted as being provided with an optional hat-shaped cover 486 that has a rubber grommet 488 installed in a centrally formed hole, through which the twisted pair wire 425 extends. The cover 486 has a circumferentially extending flange 498 that is of the same outer diameter as the mounting flange 452 of the mounting member 450. A conventional clamping nut 495, having a clamping shoulder 497 (see FIG. 3) that overlies peripheral portions of the flanges 452, 498, is tightened in place on the threaded end region 428 of the "length of pipe" 420 to securely connect the mounting member 450 and the cover 486 to the "length of pipe" 420.

A feature of the inverted-hat shaped mounting member 450 is that its central bottom wall 456 positions the switch 460 at a sufficiently low level within the "length of pipe" 420 to ensure that no trapped pocket of air will prevent liquid that backs up into the sensing chamber 440 from surrounding and buoying up the float-magnet 476 to operate the switch 460. If, in contrast, the depending central portion 454 of the mounting member 450 were quite short (so as to position the switch 460 relatively high within the sensing chamber 440), it might be necessary to vent the upper end region of the sensing chamber 440 into the drain line 410 (typically by installing a small vent tube therebetween, not shown) to ensure that a trapped pocket of air does not prevent liquid from rising sufficiently high in the sensing chamber 440 to buoy upwardly the float-magnet 476 sufficiently to operate the switch 460.

Referring to FIGS. 5 and 6, the sensor unit 500 is connected to a so-called "cleanout" of the sanitary drain line 200 by what will be referred to as an "auxiliary length of pipe" 521 that connects at its lower end with a "length of pipe" 520 that defines a sensing chamber 540 within which a switch 560 (that is identical to the above-described switch 460) is positioned by a mounting member 550 (that is identical to the mounting member 450 except that the central depending portion 554 of the mounting member 550 is slightly shorter in height than is the central depending portion 454 of the mounting member 450).

Because the sensor unit 500 utilizes components that "correspond to" (indeed, many of the components are "identical to") the above-described components of the sensor unit 400, "corresponding" components of the sensor units 400, 500 are designated by "400 series" and "500 series" numerals that "correspond" in that they differ by a magnitude of precisely one hundred. The use of such "corresponding" numerals in the drawings to designate "corresponding" components obviates the need to repeat portions of the description of components of the installation of sensor unit 400 that clearly are applicable to components of the installation of sensor unit 500, as will be readily understood by those who are skilled in the art. To the extent that any differences of consequence may exist between "corresponding" components, these either have already been pointed out or will be pointed out in the discussion that follows.

The "length of pipe" 520 is open at its bottom end for communicating with the sanitary drain line 510 at a selected location where the conduit 510 ought not fill with liquid during conditions of normal flow. Outer surface portions of the upper end region of the "length of pipe" 520 are threaded, as is indicated generally by the numeral 528.

Defined within the confines of the "length of pipe" 520 is what will be referred to as a "sensing chamber" 540 of the sensor unit 500.

The "auxiliary length of pipe" 521 has a circumferentially extending flange 523 formed at its lower end—which is the same outer diameter as the circumferentially extending mounting flange 552 of the mounting member 550. A conventional nut 595, having a clamping shoulder 597, is installed on the lower end region of the "auxiliary length of pipe" 521 and is threaded onto the threaded upper end region 528 of the "length of pipe" 520 to clamp the overlying flanges 552, 523 and to connect the "length of pipe" 520 to the "auxiliary length of pipe" 521.

At the upper end region of the "auxiliary length of pipe" 521, a resilient cover 527 is installed which has a centrally located hole, through which the twisted pair wire 525 extends as it emerges from the interior of the "auxiliary length of pipe" 521. The wire 525 has a pair of conductors 560, 592 that are connected to terminals 580, 582 of the sensor unit 500—in the same manner that the conductors 490, 492 of the wire 425 are connected to the terminals 480, 482 of the sensor unit 400. The wire 525 connects to the display panel 1100 (shown only in FIG. 1) which provides individual light and switch sets for use with the sensors 500, 600, 700, 800 preferably in the manner that the light 1010 and the switch 1030 are provided by the panel 1000 for use in conjunction with the sensor unit 400.

The "auxiliary length of pipe" 521 has an upper end region 531 that extends centrally through and is rigidly connected to an annular disc-shaped member 533 which is installed within the upper end region of the branch clean-out line 511—to thereby connect the "auxiliary length of pipe" 521 to such conduit structure as defines the branch clean out line 511.

If abnormal flow within the sanitary drain line 510 causes the sanitary drain line 510 to fill with liquid at the location of the sensor unit 500, liquid also will flow into the sensing chamber 540 of the sensor unit 500, and will cause the float-magnet 576 of the switch 560 to be buoyed upwardly to operate the switch 560 in the same manner that has been described in conjunction with the switch 460, thereby causing a signal to be transmitted along the wire 525 to the display panel 1100 to illuminate an associated light on the panel 1100 in the manner that a signal from the sensor unit 400 is sent along the wire 425 causing the light 1010 of the panel 1000 to be illuminated. In substantially the same manner, signals from the sensor units 600, 700, 800, 900 are delivered by the wires 625, 725, 825, 925, respectively to separate associated ones of the lights of the panel 1100 to cause illumination thereof.

The sensor unit 600 that is installed in the cleanout branch line 611 of the storm sewer conduit 610 is identical in all characteristics to the sensor unit 500—and therefore need not be described. To the extent that features of the installation of the sensor unit 600 are depicted in the drawings, "corresponding" features of the installations of the sensor units 500, 600 are designated in the drawings by "corresponding" numerals of the "500 series" and the "600 series" that differ by a magnitude of precisely one hundred.

Likewise, the sensor unit 700 that is installed in the test branch line 711 of the downspout drain line 710 of the storm sewer 200 is identical in all essential characteristics to the sensor units 500, 600—except that the "auxiliary length of pipe" 721 of the sensor unit 700 is shorter than are the corresponding "auxiliary lengths of pipe" 521, 621 of the sensor units 500, 600. To the extent that features of the installation of the sensor unit 700 are depicted in the drawings, "corresponding" features of the installations of the sensor units 500, 600, 700 are designated in the drawings by "corresponding" numerals of the "500 series," "600 series" and "700 series," respectively.

Figure 7:
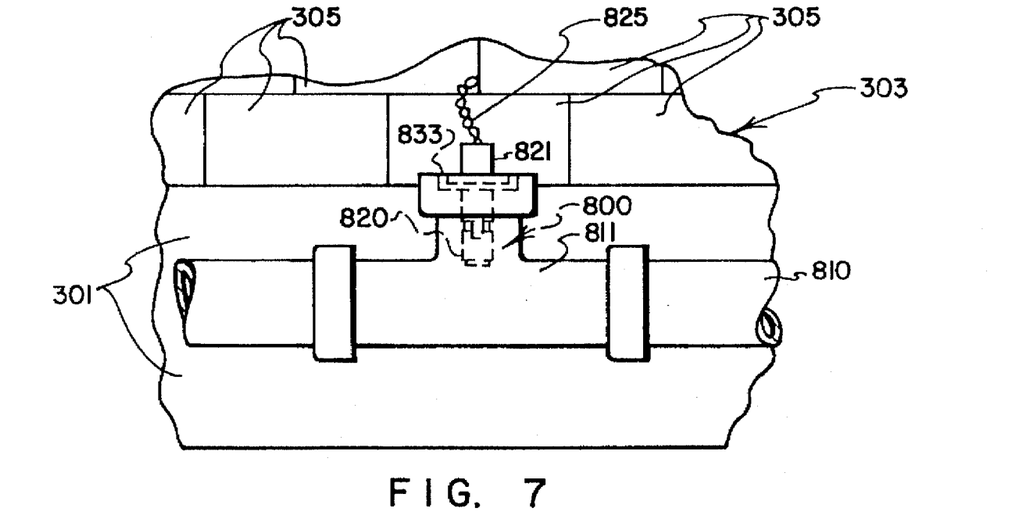
FIG. 7 is a side elevational view of portions of a footer drain line installed along the exterior of a foundation that supports a basement wall of the building of FIG. 1, with the view showing in greater detail a typical footer drain line sensor installation, a plurality of which installations are utilized in the drain line plumbing system of FIG. 1.

Referring to FIG. 7, each of the sensor units 800 that is installed in a separate one of the "T" tile 811 of the footer drain line 810 is identical to the sensor unit 700—except that its "auxiliary length of pipe" 821 is much shorter than is the corresponding "auxiliary length of pipe" 721. To the extent that features of the installation of the sensor units 800 are depicted in the drawings, "corresponding" components of the sensor units 700, 800 are designated by "corresponding" numerals of the "700 series" and "800 series," respectively.

Referring still to FIG. 7, the footer drain line 810 is depicted as extending along a poured concrete foundation footer 301 of the building 300 of FIG. 1, atop which a basement wall 303 of the building 300 is formed from concrete blocks 305. Installation of the "T" tile 811 and of the sensor units 800 connected thereto can be carried out when the footer drain line 810 initially is installed (e.g., when the building 300 is built). Alternatively, the "T" tile 811 and the sensors 800 can be installed by working from inside the basement wall 303 by temporarily removing one or more of the concrete blocks 305 from the wall 303 to provide access to the footer drain line 810 at a time long after the footer drain line 810 has been installed and covered over.

Referring to FIG. 8, the sensor unit 900 that is connected to a "Y" branch line 911 is identical to the sensor unit 800—except that a vent opening (one of many possible locations for which opening is indicated generally by the numeral 913) preferably is formed through the disc-shaped member 933 to ensure that no pocket of air forms in the branch line 911 that will prevent liquid from backing up into the branch line 911 to operate the sensor 900 (when liquid backs up to a sufficiently high level within the downspout drain line 910 to also cause liquid to simultaneously back up to an equal height into the branch line 911). A wire 925 from the sensor 900 connects with the display panel 1100 (see FIG. 1) for operating an associated light when the sensor 900 is operated due to liquid rising to a sufficiently high level within the branch line 911.

While the sensor unit installations that are depicted in FIGS. 1-8 employ sensor units that are "hard-wired" to remotely located indicators (such as the display panels 1000, 1100), other sensor installation arrangements, and other configurations of sensors and indicator panels also can be employed in carrying out the practice of the present invention—illustrations of which are shown in FIGS. 9-12.

Figure 9:
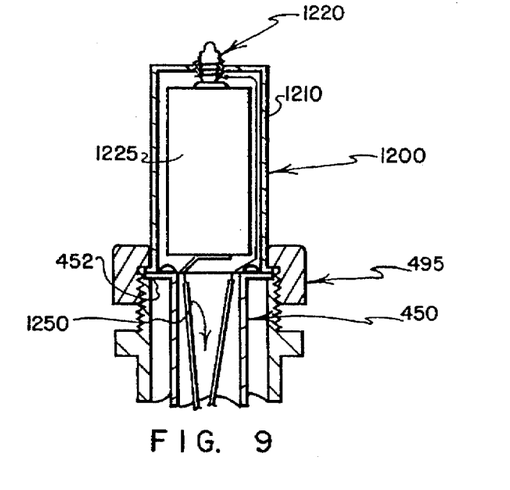
FIG. 9 is a side elevational view of an optional battery operated "local" indicator unit connected to a typical sensor unit of the general type that is depicted in FIGS. 1–8.
Figure 10:
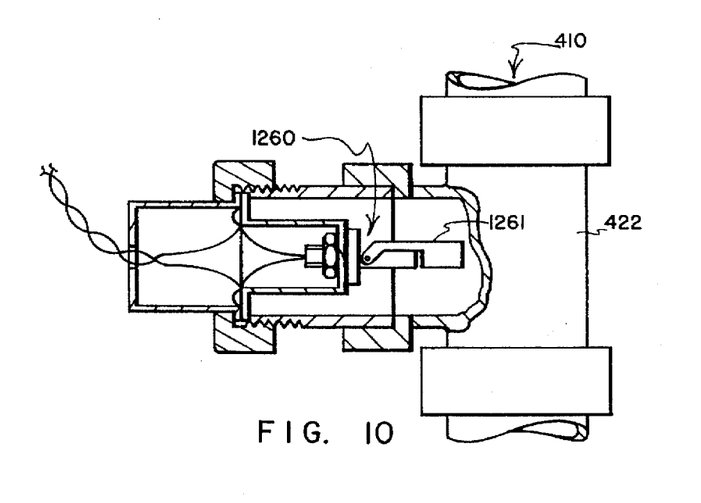
FIG. 10 is a side elevational view, with portions broken away and shown in cross section, of an alternate form of sensor unit that utilizes a generally horizontally extending, pivotal-arm type of float-operated sensor unit switch.
Figure 11:
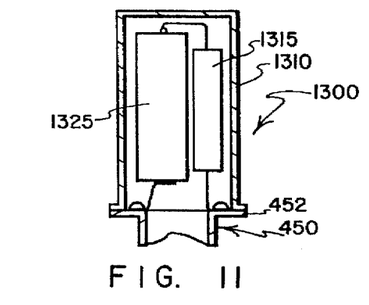
FIG. 11 is a side elevational view, with portions broken away and shown in cross section, showing a part of the sensor unit of FIGS. 2–4, to which is connected a wireless signal transmitter of a commercially available type that also can be utilized as a component of a monitoring system that embodies features of the present invention; and, FIG. 12 is a side elevational view, with portions broken away and shown in cross section, showing a part of the sensor unit of FIGS. 2–4, to which is connected an encoded signal transmitter of a commercially available type that also can be utilized as a component of a monitoring system that embodies features of the present invention.
Figure 12:
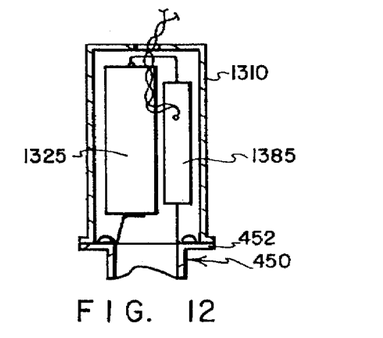

While only a few details of sensor unit installation are depicted in FIGS. 9-12, it will be understood by those who are skilled in the art that much of what has been discussed in conjunction with the installations of FIGS. 1-8 is applicable to the installations that are depicted in FIGS. 9-12. For example, details of the installation of the sensor unit 400, as depicted in FIG. 3, are applicable with only minor modification to the sensor unit installations that are depicted in FIGS. 9, 11 and 12; and, the sensor unit installation of FIG. 10 represents a modification of the sensor unit installation that is depicted in FIG. 4.

Referring to FIG. 9, a "local" indicator 1200 is shown that can be used in place of a remotely located indicator (or a remotely located display panel, such as the display panels 1000, 1100 of FIG. 1) to mount a battery powered, illuminated-light type of indicator atop an installation of a sensor unit, such as the sensor unit 400 that is depicted in FIGS. 2-4. The "local" indicator 1200 has a generally cylindrical housing 1210 that protectively encloses a battery 1225, and that mounts an illumination device such as a light emitting diode or a light bulb 1220 to provide a lighted indication in response to receipt of a signal from an underlying sensor unit, indicated generally in FIG. 9 by the numeral 1250.

While the sensor unit installations that are depicted in FIGS. 1-8 employ sensor units that have float-type switches with floats that move generally vertically along vertically extending guides, the sensor mounting system of the present invention is not limited to being deployed solely with so-called "vertically extending" float-type switches. In FIG. 10, for example, much the same sort of sensor mounting system (that is used to mount the liquid level sensor switches of the sensor units 400, 500, 600, 700, 800, 900) is utilized to pipe-mount a horizontally extending float-type sensor unit switch 1260—i.e., a switch that has a generally horizontally extending float-carrying arm 1261 that normally resides in a relatively "downward" position, but that pivots (when buoyed upwardly by the presence of liquid within a sensing chamber 1240 of the unit 1200) to effect operation of the switch 1260. Switches of the type indicated by the numeral 1260 are available from a variety of sources, for example from Omega Engineering of Stamford, Conn. 06907. (Such as those indicated in FIG. 1 by the numeral 425)

Instead of utilizing wires to electrically connect a sensor unit (such as the sensor unit 1000 shown in FIG. 1) with a remotely located indicator (such as the indicator 400 shown in FIG. 1), it also is possible to provide a sensor unit 1300 (see FIG. 11) with a wireless transmitter 1315 powered by a battery 1325. The transmitter 1315 and the battery 1325 preferably are protectively enclosed in a suitably configured housing 1310 that preferably is mounted atop a sensor unit (e.g., atop a sensor unit of the type indicated by the numeral 400 depicted in FIGS. 2-4, with the housing 1310 being substituted for the cover 486). The wireless transmitter 1315 preferably is one selected to emit a wireless signal (typically a radio or infrared signal) that can be picked up at a remote location by a suitably capable receiver (such as that indicated in FIG. 1 by the numeral 1316) that is connected to operate the indicator 1000 for operating an indicator in much the same manner as if the indicator had been operated by a direct "hard-wired" connection extending between the sensor unit and the indicator (as by utilizing the wire 425 shown in FIG. 1). In FIG. 11, for example, the sensor unit 1300 has a housing 1310 that protectively encloses a radio signal transmitter 1315 of a type that is available (together with a suitably capable radio receiver for operating a switch, not shown) at Radio Shack and other electronics stores for "wirelessly" operating such appliances as a doorbell or the like.

Referring to FIG. 12, a source-identification signal encoder unit 1385 can be incorporated into the housing 1310 in place of, or in conjunction with the use of, the wireless transmitter 1315 of FIG. 11—for use together with a suitably capable signal decoder unit (not shown) to provide an output, typically fed to a digital display (not shown), that will identify which sensor unit at which location of a system of monitored conduits has detected abnormal flow. Suitable encoder and decoder units are available from a wide variety of sources, for example communicating encoders and decoder modules and display panels of the "2190-9172" type that usually are utilized in fire alarm systems, which modules and panels are marketed by Simplex Time Recorder Company of Garner, Mass. 01441.

As those who are skilled in the art will readily understand, the display panel 1100 1) can include a set of lights that each is directly hard-wired to a separate one of the sensor units 400, 500, 600, 700, 800, 900; 2) can employ wireless communication to cause individual lights of the panel 1100 to be lighted in response to receipt of individual signals generated by associated ones of the sensor units 400, 500, 600, 700, 800; or, 3) can be replaced by other commercially available forms of indicator panels, for example those that digitally display printed information in response to receipt of encoded identification signals. Inasmuch as the precise character of a display panel or other form of "indicator" device that may be used with the sensor units 400, 500, 600, 700, 800, 900 forms no essential element of the present invention, it will be understood that a feature of the invention resides in the versatile nature of the present invention which permits its sensor units to be utilized in conjunction with a wide variety of types of commercially available display panels and other forms of purchased indicators.

As will be apparent from the foregoing description, the present invention provides a versatile and expansible form of monitoring system that can be used temporarily or in a permanent form of installation with one or a host of non-pressurized conduits of a plumbing system to monitor non-pressurized flows of liquid, to detect abnormal flows, and to provide an "early warning" of the onset of clogging and blockages, and of imminent problems that may arise because one or more drain conduits are no longer found to be of suitable capacity to serve their present-day function. Inasmuch as the uses to which drain lines of residential and commercial buildings are put frequently change as remodeling takes place and as portions of a building are put to new uses, the presence of a monitoring system of the type that embodies the preferred practice of the present invention will permit abnormal flow problems to be detected relatively early—so that problems of clogging, blockage and undersized lines can be properly addressed before these problems take on an expensive-to-fix character and/or cause significant damage.

Method and product aspects of the present invention reside in the provision of and use of monitoring systems of the type that embody various combinations of the afore-described features—it being noted that the feature of a particularly simple, easy-to-install and easy-to-service sensor mounting system that employs a circumferentially extending mounting flange that is releasably clamped in place adjacent one end of a "length of pipe" offers significant advantages over the far more complex, expensive, difficult-to-install and difficult-to-service sensor mounting arrangements of prior proposals. Because sensor units that project into drain lines and the like can collect debris that may be found to inhibit proper sensor operation (and may require periodic maintenance and replacement), it is important that sensor units of the type described be installed in a manner that facilitates sensor unit removal for cleaning, service and replacement—a need that is nicely addressed by the sensor mounting arrangement employed in in the preferred practice of the present invention.

While the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention as hereinafter claimed. It is intended that the patent shall cover, by suitable expression in the claims, such features of patentable novelty exist in the invention.

What is claimed is:

1. A method of monitoring the operation of a non-pressurized conduit through which liquid normally flows to detect abnormal flow that is characterized by a filling of an interior portion of the conduit that characteristically does not fill with liquid during normal flow of liquid through the conduit, comprising the steps of:
    a) selecting a location along a length of a non-pressurized conduit through which liquid normally flows, at which selected location a portion of the interior of the conduit does not fill with liquid during normal flow of liquid through the conduit;
    b) providing a length of pipe that has opposed first and second end regions with the second end region defining a generally annular end surface, and connecting the length of pipe to the conduit so that the first end region communicates with said portion of the interior of the conduit so that liquid that flows into and fills said portion of the interior of the conduit also will flow into the interior of the length of pipe during a condition of abnormal flow at the selected location;
    c) providing a mounting member that defines a relatively thin, generally annular, mounting flange 1) that extends circumferentially about a central portion of the mounting member, and 2) that defines a side surface that is configured to seat against and matingly engage the end surface of the length of pipe;
    d) providing a liquid level responsive electrical switch having a sensing portion thereof that responds differently to the presence and absence of liquid, and installing the switch on the mounting member by connecting the switch to the central portion of the mounting member;
    e) positioning the mounting member with the switch installed thereon adjacent the second end region such that the sensing portion of the switch extends into the interior of the length of pipe to be subjected to the presence and absence of liquid therein and to respond thereto by providing a signal indicative of the sensed presence of liquid therein, and removably securing the mounting member in place adjacent the second end region by releasably clamping the side surface of the mounting flange into seated, mating engagement with the end surface of the length of pipe along a substantially continuous, generally circular line of contact; and,
    f) providing switch responsive indicator means for providing, in response to said signal, an indication of the sensed presence of liquid within the interior of the length of pipe, which indication serves also to indicate a condition of sensed abnormal flow within the interior of the conduit at the selected location.

2. The method of claim 1 wherein the step of providing switch responsive indicator means includes the step of providing electrical wire means for electrically interconnecting the switch and the switch responsive indicator means for electrically operating the switch responsive indicator means to provide said indication in response to said signal from the switch.

3. The method of claim 1 wherein the step of providing switch responsive indicator means includes the steps of:
    a) providing and connecting to the switch an electrically operated wireless transmitter means for generating a wireless transmission in response to said signal; and,
    b) providing at a location that is remote to the switch a wireless transmission responsive indicator means for operating the indicator means at the remote location to provide said indication in response to reception of a wireless transmission from the wireless transmitter means.

4. The method of claim 1 wherein the non-pressurized conduit that is to be monitored is formed from vitreous tile, and the step of connecting the length of pipe to the conduit includes the steps of:

a) providing branch connection means in the vitreous tile conduit including a branch passage that communicates with the vitreous tile conduit at the selected location and that extends generally upwardly from the selected location;

b) providing an auxiliary length of pipe that has a length at least as long as the branch passage, and installing the auxiliary length of pipe in the branch passage 1) so that an upper end portion of the auxiliary length of pipe extends through and is connected to an upwardly opening end region of the branch passage, and 2) so that a lower end portion of the auxiliary length of the pipe extends to a position near the selected location; and, c) connecting the length of pipe to the lower end portion of the auxiliary length of pipe to position the length of pipe such that the interior of the length of pipe communicates with said portion of the interior of the conduit at the selected location.

5. The method of claim 4 wherein:

a) the step of providing switch responsive indicator means includes the step of providing electrical wire means for electrically interconnecting the switch and the switch responsive indicator means to operate the switch responsive indicator means to provide said indication in response to transmission along said wire means of the signal from the switch; and, b) the step of connecting the length of pipe to the lower end portion of the auxiliary length of pipe includes the step of positioning said wire means to extend through the auxiliary length of pipe so as to be ducted through the branch passage by the auxiliary length of pipe.

6. The method of claim 1 wherein the step of providing switch responsive indicator means includes the steps of:

a) providing electrically powered illumination means connected to the length of pipe; and, b) providing means for electrically connecting the illumination means to the switch for causing the illumination means to be lighted in response to said signal from the switch.

7. The method of claim 6 wherein the step of electrically connecting the illumination means to the switch for lighting the illumination means includes the step of connecting a battery type power source electrically in series with the switch and the illumination means for providing electrical energy to the illumination means when the switch is operated to complete a series circuit that includes the power source, the switch and the illumination means.

8. The method of claim 7 wherein the step of providing switch responsive indicator means further includes the step of providing generally cylindrical housing means connected to the length of pipe and to the illumination means for supporting the illumination means atop the length of pipe, and for defining within the generally cylindrical housing means an internal chamber for housing the battery type power source.

9. The method of claim 1 wherein the non-pressurized conduit to be monitored is a storm drain line of a building, and the step of connecting the length of pipe to the conduit includes the step of connecting the length of pipe to the storm drain line at said selected location which is located along the length of the storm drain line.

10. The method of claim 1 wherein the non-pressurized conduit to be monitored is a footer drain line that extends along the exterior of a foundation of a wall of a building, and the step of connecting the length of pipe to the conduit includes the step of connecting the length of pipe to the footer drain line at said selected location which is located along the length of the footer drain line.

11. The method of claim 10 wherein the step of connecting the length of pipe to the conduit includes the steps of:

a) providing an upwardly extending branch passage having a lower end that establishes a juncture that communicates with the footer drain line at said selected location; and, b) connecting the length of pipe to the upwardly extending branch to position said one of the opposed end regions of the length of pipe in communication with the interior of the footer drain line near said juncture.

12. The method of claim 1 wherein the non-pressurized conduit to be monitored is a downspout drain line through which a flow of water is ducted from a downspout of a building, and the step of connecting the length of pipe to the conduit includes the step of connecting the length of pipe to the downspout drain line at said selected location which is located along the length of the downspout drain line.

13. The method of claim 1 wherein the non-pressurized conduit to be monitored is a sanitary drain line of a building, and the step of connecting the length of pipe to the conduit includes the step of connecting the length of pipe to the sanitary drain line at said selected location which is located along the length of the sanitary drain line.

14. The method of claim 1 wherein the non-pressurized conduit to be monitored is a sink drain line through which a flow of liquid is ducted from a drain of a sink, and the step of connecting the length of pipe to the conduit includes the step of connecting the length of pipe to the sink drain line at said selected location which is located along the length of the sink drain line.

15. The method of claim 1 wherein the non-pressurized conduit to be monitored is an underground drain line of a building, and the step of connecting the length of pipe to the conduit includes the step of connecting the length of pipe to the underground drain line at said selected location which is located along the length of the underground drain line.

16. The method of claim 15 wherein said selected location is at a location along a length of a main passage of the underground drain line where an upwardly extending branch of the underground drain line has a juncture with the main passage to define a test port that can be opened to communicate with the interior of the main passage, and the step of connecting the length of pipe to the conduit includes the step of connecting the length of pipe to the upwardly extending branch of the underground drain line to position the first end region of the length of pipe in communication with the interior of the underground drain line near said juncture.

17. A method of monitoring a drain line of a building to detect and provide an indication of sensed abnormal flow that is characterized by a liquid filling of an interior portion of the drain line that does not fill with liquid during conditions of normal flow of liquid through the drain line, comprising the steps of:

a) selecting a location along a length of a drain line of a building through which liquid normally flows, at which selected location a portion of the interior of the drain line does not fill with liquid during normal flow of liquid through the drain line;

b) providing a length of pipe that has opposed first and second end regions with the second end region defining a generally annular end surface, and supporting the length of pipe so that the first end region communicates with said portion of the interior of the drain line so that liquid that flows into and fills said portion of the interior of the drain line also will flow into the interior of the length of pipe during a condition of abnormal flow at the selected location;

c) providing a mounting member that defines a relatively thin, generally annular, mounting flange 1) that extends circumferentially about a central portion of the mounting member, and 2) that defines a side surface that is configured to seat against and matingly engage the end surface of the length of pipe;

d) providing a liquid level responsive electrical switch having a sensing portion thereof that responds differently to the presence and absence of liquid, and mounting the switch on the central portion of the mounting member;

e) positioning the mounting member with the switch installed thereon 1) such that the side surface of the mounting flange is adjacent the end surface of the length of pipe, and 2) such that the sensing portion of the switch extends into the interior of the length of pipe to be subjected to the presence and absence of liquid therein and to respond thereto to provide a signal indicative of the sensed presence of liquid therein, and clamping the side surface into seated, mating engagement with the end surface to connect the switch to the length of pipe;

f) providing switch responsive indicator means for providing, in response to said signal, an indication of the sensed presence of liquid within the interior of the length of pipe, which indication serves also to indicate a condition of sensed abnormal flow within the interior of the drain line at the selected location.

18. The monitoring method of claim 17 wherein the step of clamping the side surface into seated, mating engagement with the end surface includes the step of clamping the side surface to the end surface along substantially the full lengths thereof so that a substantially continuous, generally circular line of seated, engaging contact is established between the side surface and the end surface.

19. The method of claim 17 wherein:

a) the step of providing a liquid level responsive switch includes the step of providing a float-operated switch having a float that is movable between a switch-non-operated position and a switch-operated position; and, b) the step of removably connecting the switch to the length of pipe includes the step of positioning the float of the switch to extend into said interior of said length of pipe so that said movement of the float is caused to take place within said interior of said length of pipe.

20. A monitoring system connected to a non-pressurized conduit to provide an indication of sensed abnormal flow of liquid therein, in accordance with the method of claim 1.

21. A method of monitoring a plurality of drain lines of a building to detect and provide an indication of sensed abnormal flow within the plurality of monitored drain lines, wherein abnormal flow is characterized by a liquid filling of an interior portion of at least one of the monitored drain lines that does not fill with liquid during conditions of normal flow of liquid therethrough, comprising the steps of:

a) selecting a location along a length of each of a plurality of drain lines of a building through which liquid normally flows, at each of which selected locations a portion of the interior of the associated drain line does not fill with liquid during normal flow of liquid through the associated drain line;

b) providing at each of the selected locations a separate associated length of pipe that has opposed first and second end regions with the second end region defining a generally annular end surface, and supporting the each of the separate associated lengths of pipe so that the first of the opposed end regions thereof communicates with said portion of the interior of the associated drain line so that liquid that flows into and fills said portion of the interior of the associated drain line also will flow into the interior of the associated length of pipe during a condition of abnormal flow at the associated selected location;

c) providing at each of the selected locations a separate associated mounting member that defines a relatively thin, generally annular, mounting flange 1) that extends circumferentially about a central portion of the mounting member, and 2) that defines a side surface that is configured to seat against and matingly engage the end surface of the associated length of pipe;

d) providing at each of the selected locations a separate associated liquid level responsive electrical switch having a sensing portion thereof that responds differently to the presence and absence of liquid, and mounting the switch on the central portion of the associated mounting member;

e) positioning each of the mounting members with the associated switch installed thereon 1) such that the side surface of the associated mounting flange is adjacent the end surface of the associated length of pipe, and 2) such that the sensing portion of the switch extends into the interior of the associated length of pipe to be subjected to the presence and absence of liquid therein and to respond thereto to provide a signal indicative of the sensed presence of liquid therein, and clamping the side surface into seated, mating engagement with the end surface to connect the switch to the associated length of pipe;

e) providing switch responsive indicator means for providing, in response to each of said signals, an indication of the sensed presence of liquid within the interior of the associated length of pipe, which indication serves also to indicate a condition of sensed abnormal flow within the interior of the associated monitored drain line.

22. A monitoring system for monitoring the operation of a non-pressurized conduit through which liquid normally flows to detect abnormal flow characterized by a backup of liquid therein, comprising:

a) elongate pipe means including a length of pipe that has opposed first and second end regions with the second end region defining a generally annular end surface, for being connecting to the conduit so that the first end region communicates with the conduit at a selected location that does not fill with liquid during normal flow of liquid through the conduit, to thereby communicate the interior of the length of pipe with the interior of the conduit at the selected location;

b) a mounting member that defines a relatively thin, generally annular mounting flange 1) that extends circumferentially about a central portion of the mounting member, and 2) that defines a side surface that is configured to seat against and matingly engage the end surface of the length of pipe;

c) liquid level responsive electrical switch means having a sensing portion thereof for responding responds differently to the presence and absence of liquid, and for being installed on the mounting member by being connected to a central portion of the mounting member;

d) with the mounting member having the switch installed thereon adjacent the first end region of the length of pipe such that the sensing portion of the switch extends into the interior of the length of pipe to be subjected to the presence and absence of liquid therein and to respond thereto to provide a signal indicative of the sensed presence of liquid therein;

f) clamping means for removably securing the mounting member to the length of pipe by releasably clamping the side surface of the mounting flange into seated, mating engagement with the end surface of the length of pipe along a substantially continuous, generally circular line of contact; and, g) switch responsive indicator means for providing an indication of sensed abnormal flow in response to said signal.

23. The monitoring system of claim 22 additionally including electrical wire means for electrically interconnecting the switch and the switch responsive indicator means for electrically operating the switch responsive indicator means to provide said indication in response to said signal from the switch.

24. The monitoring system of claim 22 additionally including electrically operated wireless transmitter means electrically connected to the switch for generating a wireless transmission in response to said signal; and, b) wireless transmission responsive indicator means for operating the indicator means at a location that is remote to the switch to provide said indication in response to reception of a wireless transmission from the wireless transmitter means.

25. The monitoring system of claim 22 wherein:

a) the non-pressurized conduit that is to be monitored is formed from vitreous tile;

b) branch connection means is provided for connecting with the vitreous tile conduit to define a branch passage that communicates with the vitreous tile conduit at the selected location and that extends generally upwardly from the selected location;

b) an auxiliary length of pipe is provided that has a length at least as long as the branch passage, and is installed in the branch passage 1) so that an upper end portion of the auxiliary length of pipe extends through and is connected to an upwardly opening end region of the branch passage, and 2) so that a lower end portion of the auxiliary length of the pipe extends to a position near the selected location; and, c) the length of pipe is connected to the lower end portion of the auxiliary length of pipe to position the length of pipe such that the interior of the length of pipe communicates with said portion of the interior of the conduit at the selected location.

26. The monitoring system of claim 25 additionally including electrical wire means for electrically interconnecting the switch and the switch responsive indicator means to operate the switch responsive indicator means to provide said indication in response to transmission along said wire means of the signal from the switch; and, the said wire means extends through the auxiliary length of pipe so as to be ducted through the branch passage by the auxiliary length of pipe.

27. The monitoring system of claim 22 additionally including:

a) electrically powered illumination means connected to the length of pipe; and, b) means for electrically connecting the illumination means to the switch for causing the illumination means to be lighted in response to said signal from the switch.

28. The monitoring system of claim 27 additionally including battery means electrically in series with the switch and the illumination means for providing electrical energy to the illumination means when the switch is operated to complete a series circuit that includes the power source, the switch and the illumination means.

29. The monitoring system of claim 28 additionally including generally cylindrical housing means connected to the length of pipe and to the illumination means for supporting the illumination means atop the length of pipe, and for defining within the generally cylindrical housing means an internal chamber for housing the battery means.

30. The monitoring system of claim 22 wherein the non-pressurized conduit to be monitored is a storm drain line of a building.

31. The monitoring system of claim 22 wherein the non-pressurized conduit to be monitored is a footer drain line that extends along the exterior of a foundation of a wall of a building.

32. The monitoring system of claim 22 wherein the non-pressurized conduit to be monitored is a downspout drain line through which a flow of water is ducted from a downspout of a building.

33. The monitoring system of claim 22 wherein the non-pressurized conduit to be monitored is a sanitary drain line of a building.

34. The monitoring system of claim 22 wherein the non-pressurized conduit to be monitored is a sink drain line through which a flow of liquid is ducted from a drain of a sink.

35. The monitoring system of claim 22 wherein the non-pressurized conduit to be monitored is an underground drain line of a building.

36. The monitoring system of claim 35 wherein said selected location is at a location along a length of a main passage of the underground drain line where an upwardly extending branch of the underground drain line has a juncture with the main passage to define a test port that can be opened to communicate with the interior of the main passage, and the step of connecting the length of pipe to the conduit includes the step of connecting the length of pipe to the upwardly extending branch of the underground drain line to position the first end region of the length of pipe in communication with the interior of the underground drain line near said juncture.

37. The monitoring system of claim 22 wherein:

a) the liquid level responsive switch includes a float-operated switch having a float that is movable between a switch-non-operated position and a switch-operated position; and, b) the float of the switch extends into said interior of said length of pipe so that said movement of the float is caused to take place within said interior of said length of pipe.

38. A sensor unit for connection to a selected location of a non-pressurized conduit through which liquid normally flows, with said selected location constituting a conduit region that does not fill with liquid during normal flow of liquid through the conduit, for operating an electrical switch of the sensor unit in response to the detection of filling of the conduit region to indicate sensed abnormal flow at the selected location, comprising:

- a) elongate pipe means including a length of pipe that has opposed first and second end regions with the second end region defining a generally annular end surface, for being connecting to the conduit so that the first end region communicates with the conduit at a selected location that does not fill with liquid during normal flow of liquid through the conduit, to thereby communicate the interior of the length of pipe with the interior of the conduit at the selected location;

- b) a mounting member that defines a relatively thin, generally annular mounting flange 1) that extends circumferentially about a central portion of the mounting member, and 2) that defines a side surface that is configured to seat against and matingly engage the end surface of the length of pipe;

- c) liquid level responsive electrical switch means having a sensing portion thereof for responding responds differently to the presence and absence of liquid, and for being installed on the mounting member by being connected to a central portion of the mounting member;

- d) with the mounting member having the switch installed thereon adjacent the other of the the second end region of the length of pipe such that the sensing portion of the switch extends into the interior of the length of pipe to be subjected to the presence and absence of liquid therein and to respond thereto to provide a signal indicative of the sensed presence of liquid therein; and,

- f) clamping means for removably connecting the mounting member to the length of pipe by releasably clamping the side surface of the mounting flange into seated, mating engagement with the end surface of the length of pipe along a substantially continuous, generally circular line of contact.

* * * * *